US009426653B2

(12) United States Patent
Becker et al.

(10) Patent No.: US 9,426,653 B2
(45) Date of Patent: Aug. 23, 2016

(54) SECURE REMOTE ACCESS USING WIRELESS NETWORK

(71) Applicant: Honeywell International Inc., Morristown, NJ (US)

(72) Inventors: Robert Charles Becker, Eden Prairie, MN (US); Bruce W. Anderson, Andover, MN (US); Alan Cornett, Andover, MN (US); Todd Charles Steeves, Shoreview, MN (US)

(73) Assignee: Honeywell International Inc., Morris Plains, NJ (US)

( * ) Notice: Subject to any disclaimer, the term of this patent is extended or adjusted under 35 U.S.C. 154(b) by 117 days.

(21) Appl. No.: 13/943,858

(22) Filed: Jul. 17, 2013

(65) Prior Publication Data

US 2015/0024710 A1    Jan. 22, 2015

(51) Int. Cl.
*H04W 12/06*    (2009.01)
*H04W 84/04*    (2009.01)
*H04L 29/06*    (2006.01)
*G07C 9/00*    (2006.01)

(52) U.S. Cl.
CPC ............ *H04W 12/06* (2013.01); *H04W 84/045* (2013.01); *G07C 9/00* (2013.01); *H04L 63/02* (2013.01); *H04L 63/0853* (2013.01); *H04L 63/107* (2013.01)

(58) Field of Classification Search
CPC ... H04W 84/10; H04W 84/105; H04W 84/12; H04W 12/06; H04W 12/08; H04W 4/008; H04W 4/022; H04W 4/04; H04W 12/00; H04W 12/02; H04W 12/04; G06F 21/30; G06F 21/305; G06F 21/31; G06F 21/44; G06F 21/445
See application file for complete search history.

(56) References Cited

U.S. PATENT DOCUMENTS

| 2009/0065578 | A1* | 3/2009 | Peterson et al. | 235/382 |
| 2012/0157052 | A1* | 6/2012 | Quade | 455/411 |
| 2012/0202459 | A1* | 8/2012 | Martell et al. | 455/410 |
| 2013/0103939 | A1* | 4/2013 | Radpour | H04L 9/083 713/152 |
| 2013/0223242 | A1* | 8/2013 | Chan | H04L 27/2663 370/252 |
| 2014/0201532 | A1* | 7/2014 | Toy et al. | 713/171 |

* cited by examiner

*Primary Examiner* — Nam Huynh
(74) *Attorney, Agent, or Firm* — Schwegman Lundberg & Woessner, P.A.

(57) ABSTRACT

A method includes receiving a request from a mobile device to attach to a private wireless network, determining if a subscriber identifier is in a security database, determining if a mobile device equipment identifier is in the security database, authenticating the phone using the subscriber identifier and the mobile device equipment identifier, granting access to the private wireless network only if the phone is authenticated, and passing data between a computer system and a mobile device to monitor and control a remote monitoring and control system.

20 Claims, 6 Drawing Sheets

SECURE REMOTE ACCESS USING WIRELESS NETWORK

BACKGROUND

Control of industrial facilities has traditionally been housed in a control room where all aspects of a plant can be monitored from a central point using an isolated (air-gapped) network to connect various sensors and controls. However, this single point of access to the network does not address the needs of facilities staff to assess the state of various pieces of equipment and perform inspections of equipment when out of the control room. Obtaining status of equipment while in the field is currently addressed by WiFi devices and controlled access points. However, WiFi is potentially vulnerable to interception and exploitation, and because of this control is generally not allowed over wireless links. To effect control from the field, communication with the control room is required, and is currently achieved by such means as by telephone or radio. Thus, the employee in the field is now required to carry multiple pieces of equipment (e.g., telephone, radio, and computer) to perform field work. A smart phone could reduce this to one piece of equipment, but because critical data and control system information as well as control system access flows through public infrastructure, it is vulnerable to hacking. As a result, access to plant control by smart phone-based technology is not allowed.

SUMMARY

A method of accessing a network using a private wireless network wherein a private wireless network receives a request from a mobile device to attach to the private wireless network, determines if a subscriber identifier is in a security database, determines if a mobile device equipment identifier is in the security database, authenticates the phone using the subscriber identifier and the mobile device equipment identifier, grants access to the private wireless network only if the phone is authenticated, and passes data between an isolated computer system and a mobile device to monitor and control a remote monitoring and control system.

In one alternative, the method is implemented in computer executable code stored on a computer readable storage device. A system includes a security center having a security database to determine if a subscriber identifier and a mobile device equipment identifier provided by a mobile device are in the security database and to authenticate the mobile device. A process monitor and automation controller interacts with the security center and receives communications from the authenticated mobile device.

The security center may verify secondary credentials to permit access to particular operations and data. A media server provides a private wireless network to communicate with authenticated mobile devices, the security center, and the process monitor and automation controller.

DETAILED DESCRIPTION

Figure 1:
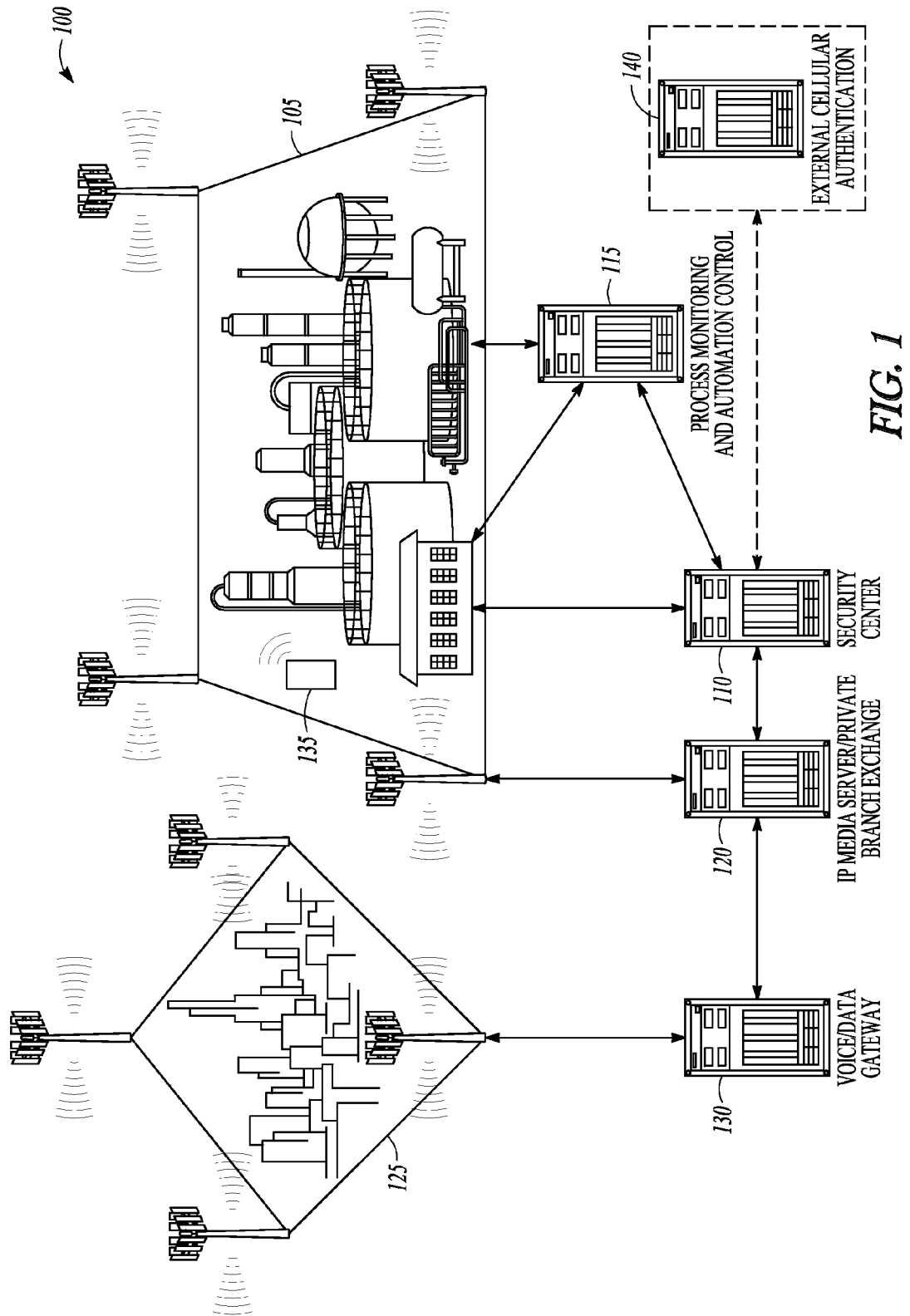
FIG. 1 is a block diagram of a system to utilize mobile devices to control a plant according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A single mobile device replaces a multiplicity of disparate devices to achieve communications and control of a remote process control system. A system and method is provided to pass cell phone data wirelessly over non-public infrastructure while assuring security of the link against hacking and even against malicious internal access. Such a secure connection facilitates plant monitoring and control via wireless devices acting as data access terminals. In various embodiments, a private cell phone network is integrated into plant security and control infrastructure. The cell phone may also be used to provide physical access to buildings or controlled access rooms in buildings using near field communications (NFC) identification codes just by placing it in proximity to a badge reader. A PIN code may be used to authenticate the phone providing a secondary security measure to prevent stolen or lost phones from being used to gain access solely based on the cell phone NFC identification code.

The use of a private network keeps critical data and data paths out of public infrastructure and makes it much more difficult to intercept and exploit. To secure the network, an IMSI (international mobile subscriber identity) and IMEI (international mobile equipment identifier) data are securely entered into and stored in a plant security database. The IMSI is a globally unique ID, and the IMEI is similar to a MAC address on a computer. The IMSI and IMEI must match in order to grant the phone access to the network. This prevents using a subscriber identity module (SIM) alone to gain access to the network. The use of the IMSI and IMEI to access an effectively isolated private network is contrasted with that of WiFi networks, where a common password is shared with many different users, greatly increasing the risk of unauthorized access.

A smart phone may also be used with special purpose applications to allow access to control and status data for various aspects of plant operation. However, just because the phone is authenticated does not mean that the person using it is authorized for particular operations or data access. Separate user ID and passwords may be used to authenticate an operator to further inhibit unauthorized or malicious access by plant employees. Due to the potential dangers presented by unauthorized access to plant control systems, plant control application data may also be encrypted by the application itself prior to introducing it to the private cellular phone network.

Once the mobile device (e.g., smart phone) is authenticated, the user is allowed to run applications that perform specific functions related to plant operation. The capability of those application is dependent on the credentials of the mobile device and possibly a secondary set of credentials provide by the operator of the mobile device. An example of secondary credentials could be PIN numbers or passwords.

The phone can also be used for physical access control via the NFC capabilities now in many smart phones. By placing a phone near to a "badge reader", the phone can be authenticated for access. To further secure a site, a PIN code, certificate password, or ID token may be used in conjunction with the phone ID information before granting access. At points of entry where a guard is present, presenting a phone to the badge reader could either bring up a picture of the employee on the phone (thereby mimicking a conventional badge) or bring up the employee's picture on a screen in front of the guard, thereby increasing the difficulty of forging the identity of someone legitimately allowed access to a building or facility.

To further inhibit long distance hacking of the wireless network, range limits may be included in the access points. 3G and LTE cellular phones employ timing offsets to compensate for the distance a phone is from a cell tower. This timing offset is used to keep the phone synchronized with the cell tower signals. By examining the timing offset of the phone, it may be determined if the phone is approximately within the perimeter of a facility or is, in fact, well outside it and thereby detect an attempt at hacking the network. Access by devices well outside of the facility perimeter may be blocked by limiting the permissible timing offsets to values that ensure a phone is within the physical boundaries of a facility.

FIG. 1 is a block diagram 100 illustrating interconnected components involved in providing a private network to facilitate secure plant 105 control via wireless devices. A security center server (SC) 110, a plant process monitor and control server (PPMC) 115, and an internet protocol (IP) media server (IMS) combined with a private branch telephone exchange (PBX) 120, and a private cellular telephone network 125 coupled to the other components via a voice/data gateway 130. An external cellular authentication device may be used by the security center 110 to authenticate mobile wireless devices indicated at 140. The connection to external, trusted authentication site 140 uses a secured, tunneling protocol for security. By only connecting to a trusted site and using a secure (encrypted) protocol, the security center 110, and by extension, the process monitoring and automation control device 115 are effectively isolated from attacks on the connection to external authentication site 140.

The security center 110 provides authentication of cellular telephones on the private cellular telephone network by first verifying that the IMSI and IMEI are in the authentication database of the security center. Further, a standard wireless telephone SIM (subscriber identity module) card contains a secret encryption key that is securely entered into the authentication database. The authentication process uses the secret key stored in the authentication database to confirm that the cellphone is allowed on the network using standard cellular telephone authentication processes. Security center 110 may also utilize external authentication services 140. If a phone can't be authenticated, it is not allowed on the network.

If application access were to reside strictly with the IMSI as identification and authorization, stealing a SIM card could allow unauthorized personnel access above their authorization level. To prevent this, the IMSI in the SIM card should match an authorized IMEI.

The security center 110 may also control physical plant access. This can be accomplished in several ways. Most commonly, a security center database is used to store ID badge numbers of employees. When a badge is presented to a reader, the security center grants access by unlocking a door or gate depending on whether or not the badge number is permitted to enter the space behind the gate. Additionally, an employee can use the near field communications (NFC) capabilities of a modern smart phone to present credentials to a badge reader at an access control point. As an additional security layer, the use could be required to key in a PIN (personal identification number) to "unlock" NFC verification in a manner similar to the way a PIN code unlocks access to a smart card. The PIN may be entered via the smart phone or a keypad at the access control point.

Additionally, the security center is used to regulate access to plant operations. Plant operators can have different access credentials for different parts of the facility. For example, Operator A is allowed to monitor and control only Section 1 of the plant. Operator B is allowed to monitor and control only Section 2 of the plant. Operator C is allowed to monitor and control Section 1 and Section 2. In order to perform their various functions, each operator would have to "log in" to their various operating stations using a user ID and password system, encrypted certificates, or secure tokens (such as the RSA SecurID), or a similar process. In this way, people unfamiliar with operating different areas of the plant or unauthorized for access to those areas would not be able to access and modify those operations. Granular access control based authentication is thereby provided.

The security center 110 also controls access to plant information. For example, a plant employee carrying smart phone 135 is authenticated by the security center to be on the private network. While in a remote area of the plant, the employee determines that he has a need to know the valve settings for a particular valve. Using a smart phone, the employee can start an application to access various plant functions and data. The application requests the data from the IP media server 120 which then asks the security center 110 if this employee is authorized to access this data. The security center 110 determines that the employee is authorized to access this information and requests any additional credentials as may be required. Depending on the credentials presented, the security center either passes the authorization to the IP media server 120 where the data request is granted and the requested data is passed to the employee's smart phone 135 or the request is denied and the security center logs the failed authorization request.

If sufficient sequential authorizations fail, this could invoke a security policy to lock out access or take other hacking prevention measures. Just because the employee has an authorized smart phone does not necessarily allow him unfettered access to the entire plant automation.

Process monitoring and automation control 115 supervises plant operation. A plant may be an industrial process control plant in some embodiments, or other type of control system, such as a security control system in further embodiments. Process monitoring and automation control 115 resides in or is linked to a control room to provide operator access to plant processes. It is linked to the security center 110 to control access to plant processes and control level of access allowed to various plant personnel. It may also distributed data to IP media server 120 as permitted by the security center 110.

IP media server 120 controls the private cellular network and authenticate users and equipment with the security center 110. IP media server 120 passes data to and from the private cellular network for process monitoring and automation control 115 via security center 110. IP media server 120 provides a private branch exchange for a cellular voice and data network.

Security center 110 effectively serves as a firewall to isolate the network of process monitoring and automation control 115 from outside access via IP media server 120 and IP media server 120 serves as a firewall to isolate the security center from voice data gateway 130. The use of multiple firewall-like devices is critical if a previously air-gap isolated network is to be protected when it is no longer air-gapped yet the security of an air-gapped network is desired.

Figure 2:
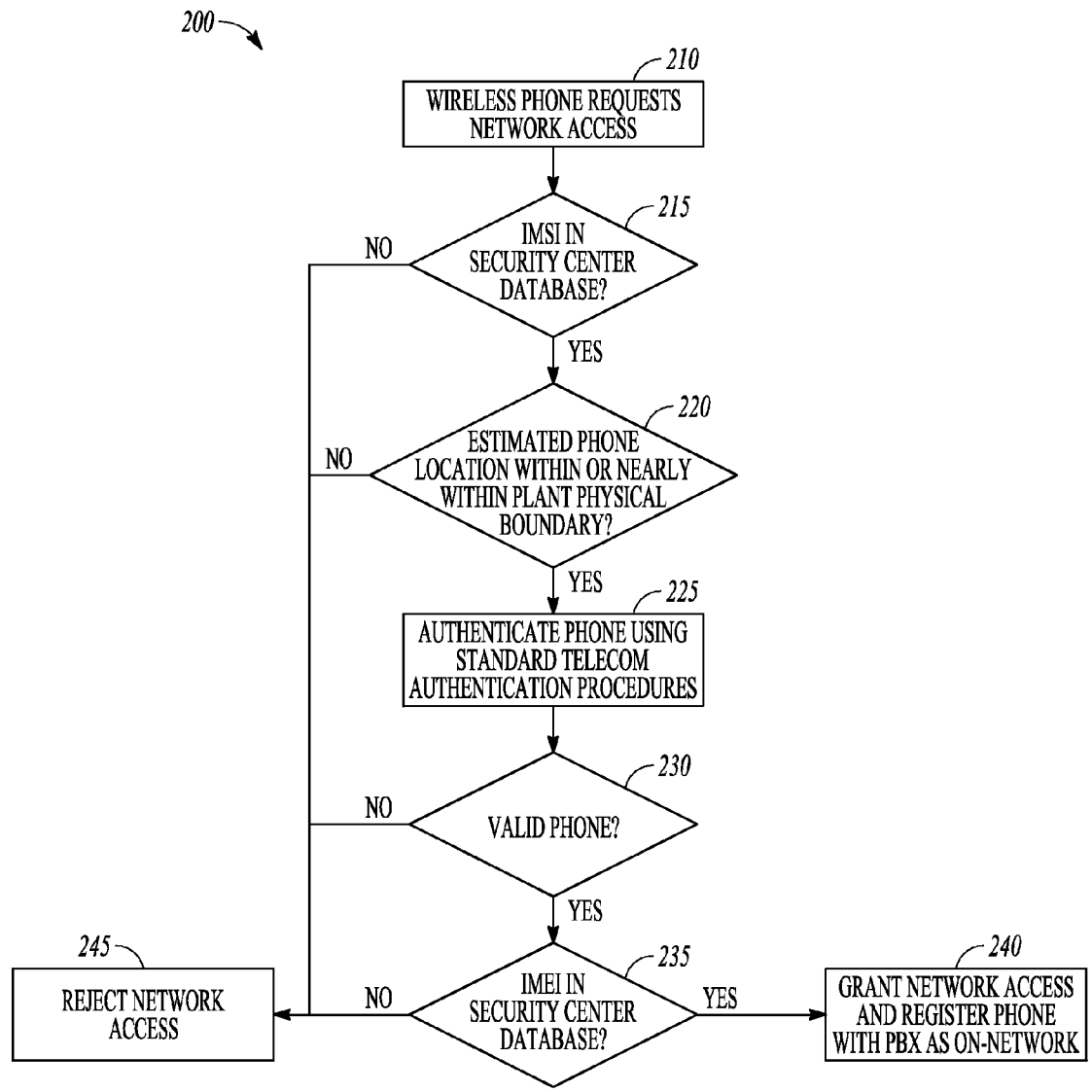
FIG. 2 is a flowchart illustrating a method of authenticating mobile devices for a private wireless network according to an example embodiment.

FIG. 2 is a flow diagram illustrating a method 200 of controlling initial phone access to the network. At 210, a wireless phone requests network access. A check is made in the security center database at 215 to determine if the IMSI of the phone is in the database. If it is, a further check is performed at 220 to estimate whether the phone location is within or nearly within a plant physical boundary. This may be referred to as approximately within a perimeter or boundary of the plant.

If the phone location is approximately within the boundary or perimeter of the plant, an authentication of the phone is performed using standard telecom authentication procedures at 225. This may involve sending a value and an encrypted copy to the phone to assure that the network it is attempting to connect to is legitimate as well as having the phone send back a value and an encrypted copy to the network to assure that the phone has the proper credentials. The received encrypted values are compared to the expected encrypted values based on the same shared key that may be unique to the smart phone, and comparing to ensure that the value results in the same encrypted value received. In this manner, both the phone and the network can be authenticated. The encryption, in one embodiment, is based on a shared encryption key on the SIM that is known to the authentication entity and associated with the IMEI of the phone. Since the SIM itself does not make the key available, and may perform the encryption and decryption itself, it cannot be duplicated. Various other telecom authentication procedures may be followed in further embodiments. If the phone is determined as valid at 230 the IMEI of the telephone is checked at 235 to determine if the SIM card is in the correct phone in order to disallow the use of stolen SIM cards. If the phone passes all of these checks, network access is granted at 240, and the phone is registered as on-network with the PBX 120, also referred to as the IP media server 120. If the IMSI is not in the security center database at 215, is determined to be not within the plan boundaries at 220, is not valid at 230, or if the IMEI and IMSI are mismatched, network access is rejected at 245.

Figure 3:
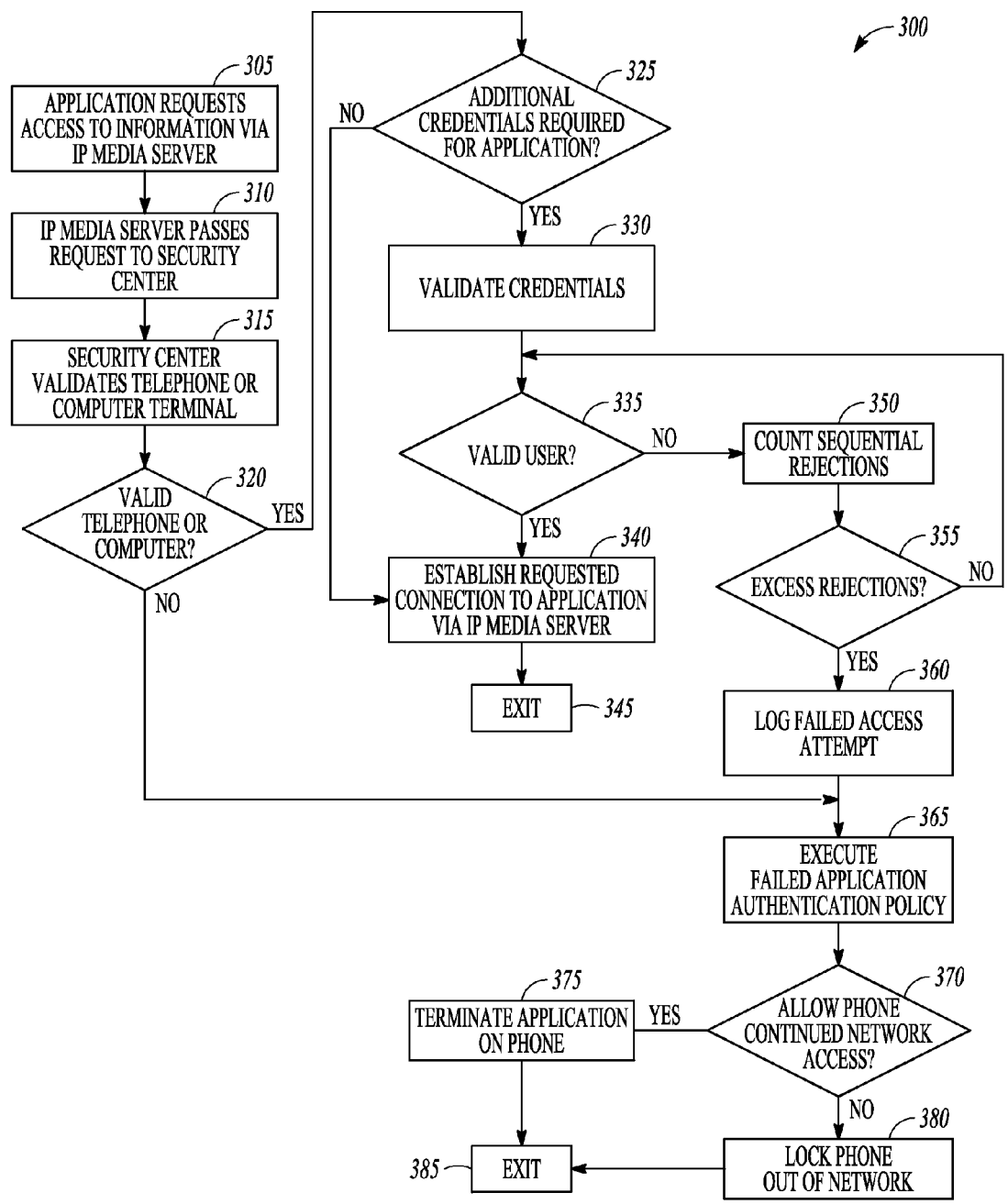
FIG. 3 is a flowchart illustrating a method of providing access to an application running on a mobile device or computer terminal according to an example embodiment.

FIG. 3 is a flow diagram illustrating a method 300 of providing access to an application running on a phone or computer terminal access on the private network. The application first requests access at 305 to information via the IP media server 120. The IP media server 120 passes the request to security center 110 at 310. The security center 110 validates the telephone or computer terminal at 315. If the telephone or computer terminal is valid as indicated at 320, a check is made to determine whether additional credentials may be required for the application at 325. This may occur because of further restrictions on access to particular control functions imposed by the security center. Once the additional credentials are validated at 330, a requested connection is established to the application via the IP media server 120 and the method exits at 345.

If the user is not a valid user as indicated at 335, a count of sequential rejections is made at 350. If the count does not exceed an excess number of rejections at 355, a check is made again to determine if the user is a valid user at 335, allowing the user to resubmit credentials. If the count exceeds the excess number of rejections at 355, a failed access attempt is logged at 360, and a failed application authentication policy is executed at 370. The failed application authentication policy is also executed if the telephone or computer terminal is found not valid at 320. Based on the executed policy at 365, a decision is made at 370 whether to allow continued access. If yes, the application on the phone is terminated at 375, but if no, the phone is locked out of the network at 380. The process then exits at 385.

Figure 4:
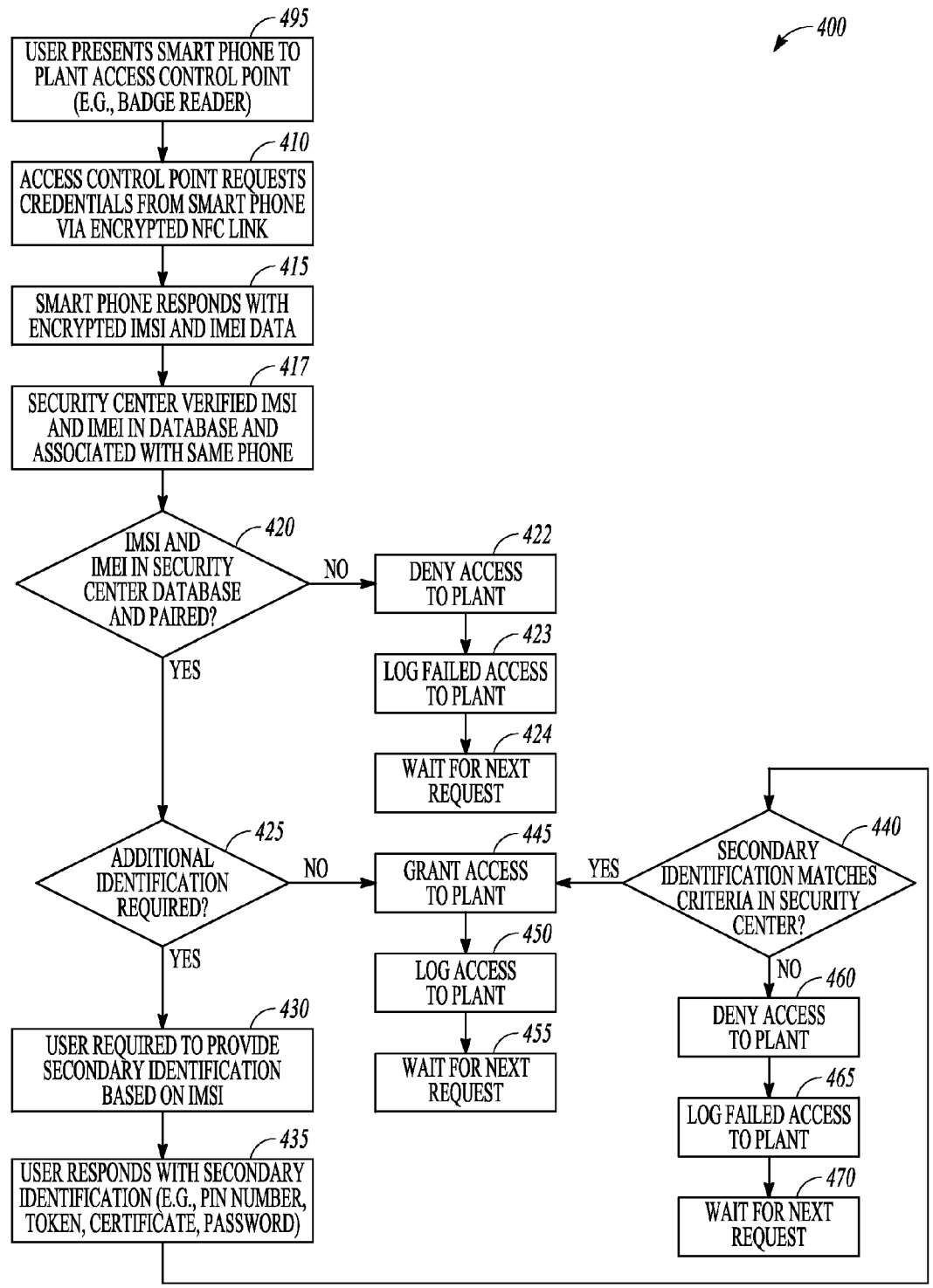
FIG. 4 is a flowchart illustrating a method for controlling physical plant access using a smart phone according to an example embodiment.

FIG. 4 is a flowchart illustrating a method 400 for controlling physical plant access using a smart phone. At 405, a user wishing to access the plant or an area in the plant that is controlled presents the smart phone to a plant access control point such as a badge reader. The access control point requests credentials from the smart phone via an NFC link at 410. At 415, the smart phone responds with encrypted IMSI and IMEI data. The security center 110 may then verify the IMSI and IMEI in its database with respect to the phone at 417. At 420, if the IMSI and IMEI in the security center database do not match that of the phone, access to the plant is denied at 422, the failed attempt to access the plant is logged at 423, and the next request is waited for at 424.

If the IMSI and IMEI in the security center database match that of the phone at 420, a check is made at 425 to determine if addition identification is required. If yes, at 430, the user is required to provide secondary identification based on the IMSI. The user responds at 435 with the secondary identification, which may consist of a person identification number (PIN), token, certificate, password or other secondary identification. If the secondary identification matches the criteria in the security center 110, or if no further identification was required at 425, access to the plant is granted at 445, logged at 450, and the next request is waited for at 455.

If the secondary identification did not match the criteria in the security center 110, access to the plant is denied at 460, the failed access attempt is logged at 465, and the next request is waited for at 470.

Figure 5:
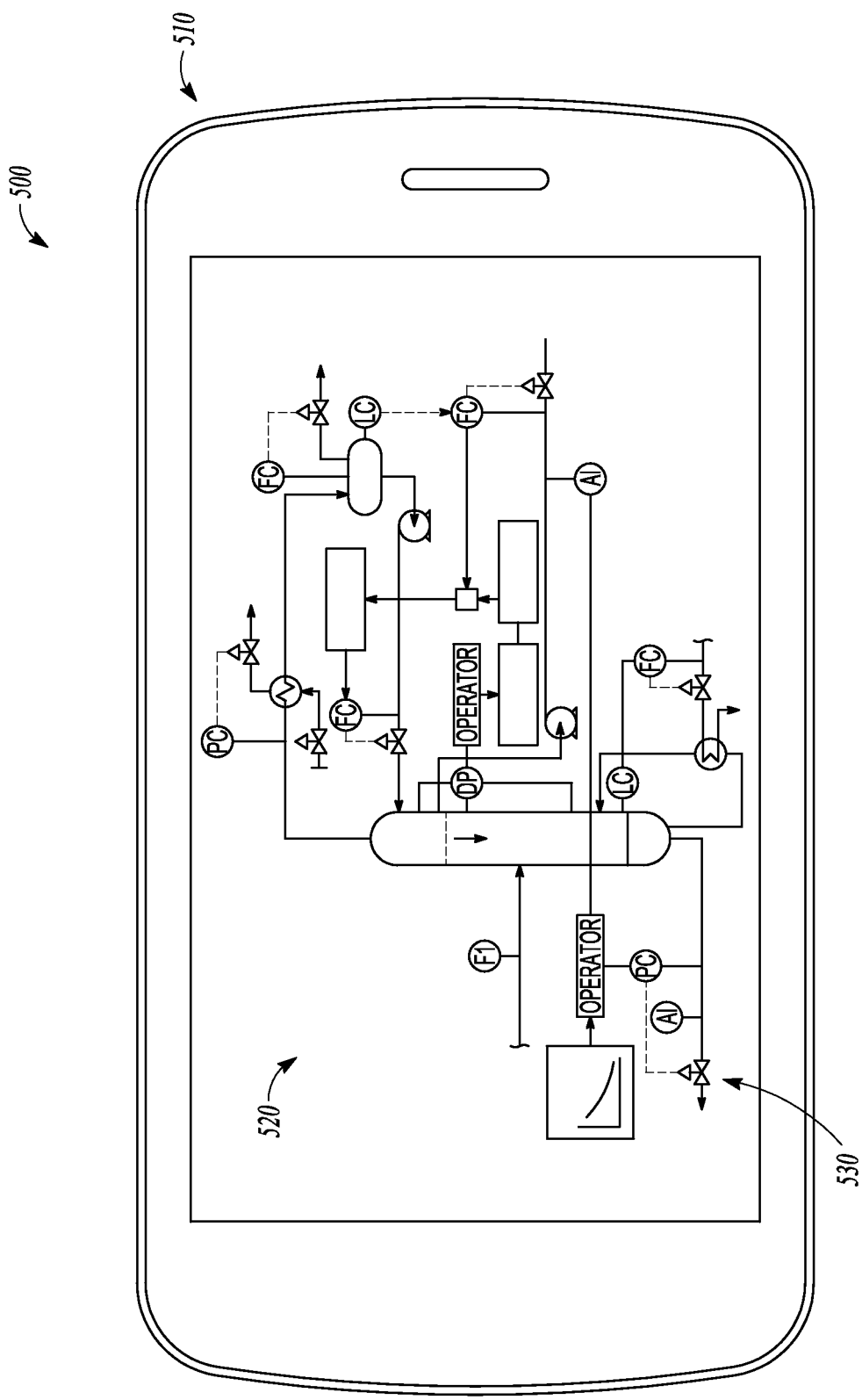
FIG. 5 is an illustration of a smart phone showing a plant operations diagram.

FIG. 5 is an example of a smart phone system 500 showing smart phone 510 displaying a plant operations status and control screen 520, There are a multiplicity of ways to display plant information and screen 520 is an example embodiment of such a display. Such a displayed image may contain hierarchical elements such as valve 530. In such a hierarchical image, the act of selecting valve 530 may bring up a secondary image showing the status of the valve (open or closed) or other information, and may also provide the ability to change the position of the valve, either through gestures or drop down menu selections. Such control may also be provided for various elements of the plant via the smart phone 510.

Figure 6:
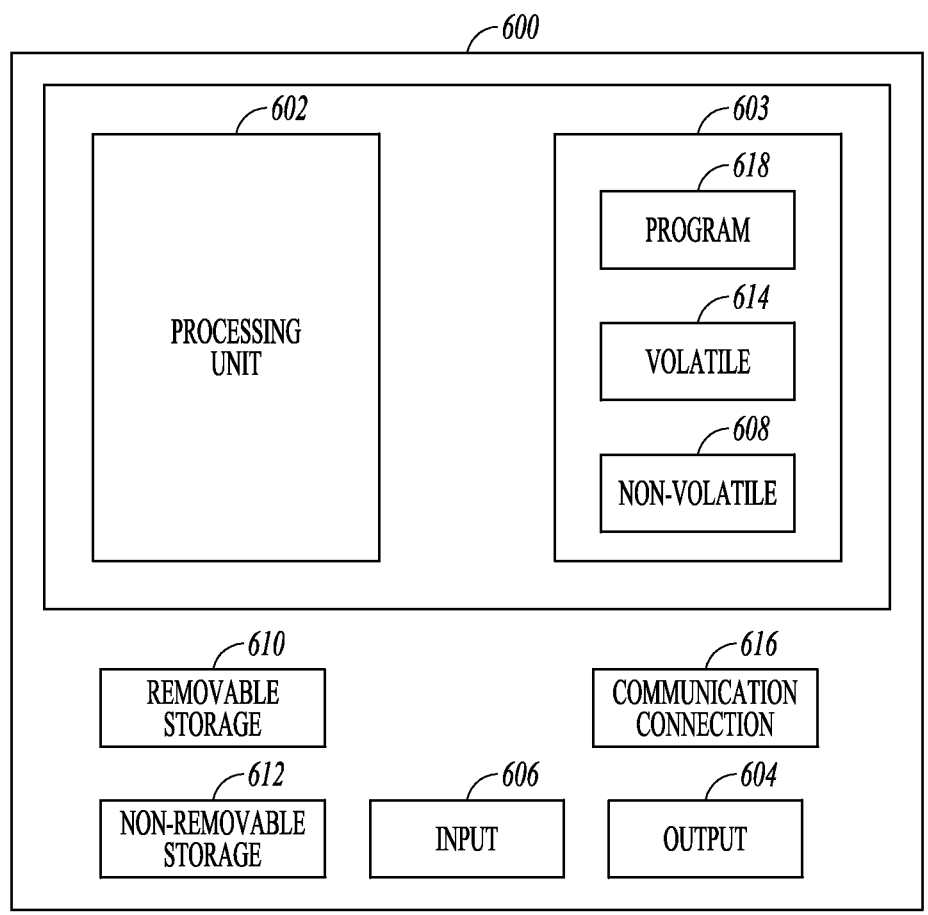
FIG. 6 is a block diagram of a computer system for implementing one or more devices and methods according to an example embodiment.

FIG. 6 is a block schematic diagram of a computer system 600 to implement various devices including computer systems and mobile devices, and methods according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 600 may include a processing unit 602, memory 603, removable storage 610, and non-removable storage 612. Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 600 may include or have access to a computing environment that includes input 606, output 604, and a communication connection 516. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 600. A hard drive, CD-ROM, and RAM are some examples of articles including a non-transitory computer-readable medium. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

EXAMPLES

1. A method comprising:
receiving a request from a mobile device to attach to a private wireless network;
determining if a subscriber identifier is in a security database; determining if a mobile device equipment identifier is in the security database;
authenticating the mobile device using the subscriber identifier and the mobile device equipment identifier;
granting access to the private wireless network only if the mobile device is authenticated;
securely passing data between an isolated computer system and a mobile device to monitor and control a remote monitoring and control system.

2. The method of example 1 and further comprising:
estimating whether a mobile device is located approximately within a remote monitoring and control system boundary; and
rejecting network access if the mobile device is not located approximately within the boundary.

3. The method of any of examples 1-2 and further comprising registering the mobile device with a private branch exchange as on-network if access is granted.

4. The method of any of examples 1-3 and further comprising:
determining if the use of the mobile device is authorized to access or manipulate data from a remote monitoring and control system;
determining if the user of the authorized mobile device is authorized to access or manipulate data from a remote monitoring and control system; and
making modifications to data of a remote monitoring and control system.

5. The method of any of examples 1-4 and further comprising:
receiving an application request to access information;
validating additional credentials; and
establishing a connection to access the requested information based on the validation of the additional credentials.

6. The method of example 6 and further comprising:
rejecting requests where invalid additional credentials are provided;
tracking the number of sequential rejected requests; and
determining whether to lock the phone out of the network as a function of an excess number of sequential rejected requests.

7. The method of any of examples 1-6 and further comprising:
receiving the subscriber identifier and the equipment identifier at a security access control point via near field communications; and
granting access based on a comparison to information stored in the security database.

8. The method of example 7 and further comprising:
determining if additional credentials are required prior to granting access;
receiving the additional credentials from a user of the mobile device; and
granting access if the additional information matches information in the security database.

9. The method of example 8 wherein the additional information comprises a pass code.

10. The method of example 7 wherein the subscriber identifier and the equipment identifier are received as encrypted values.

11. A computer readable storage device having instructions for causing a computer to perform a method, the method comprising:
receiving a request from a mobile device to attach to a private wireless network;
determining if a subscriber identifier is in a security database;
determining if a mobile device equipment identifier is in the security database;
authenticating the mobile device using the subscriber identifier and the mobile device equipment identifier;
granting access to the private wireless network only if the phone is authenticated; and
passing data between a computer system and a mobile device to monitor and control an isolated remote monitoring and control system.

12. The computer readable storage device of example 11 wherein the method further comprises:
estimating whether a mobile device is located approximately within a plant boundary; and
rejecting network access if the mobile device is not located approximately within the plant boundary.

13. The computer readable storage device of any of examples 11-12 wherein the method further comprises registering the mobile device with a private branch exchange as on-network if access is granted.

14. The computer readable storage device of any of examples 11-13 wherein the method further comprises:
determining if the mobile device is authorized to access or manipulate data from an isolated remote monitoring and control system;
determining if the user of the authorized mobile device is authorized to access or manipulate data from an isolated remote monitoring and control system; and
making modifications to data of an isolated remote monitoring and control system.

15. The computer readable storage device of any of examples 11-14 wherein the method further comprises:
receiving an application request to access information;
validating additional credentials;
establishing a connection to access the requested information based on the validation of the additional credentials;
rejecting requests where invalid additional credentials are provided;
tracking the number of sequential rejected requests; and
determining whether to lock the phone out of the network as a function of an excess number of sequential rejected requests.

16. The computer readable storage device of any of examples 11-15 wherein the method further comprises:
receiving the subscriber identifier and the equipment identifier at a security access control point via near field communications;
granting access based on a comparison to information stored in the security database;
determining if additional information is required prior to granting access;
receiving the additional information from a user of the mobile device; and
granting access if the additional information matches information in the security database.

17. A system comprising:
a security center having a security database to determine if a subscriber identifier and a mobile device equipment identifier provided by a mobile device are in the security database and to authenticate the mobile device;
a process monitor and automation controller to interact with the security center and receive communications from the authenticated mobile device; and
a media server to provide a private wireless network to communication with authenticated mobile devices, the security center, and the process monitor and automation controller, wherein data is passed between the isolated system and a mobile device to remotely monitor and control the process monitor and automation controller.

18. The system of example 17 wherein the security center is programmed to:
estimate whether a mobile device is located approximately within a plant boundary; and
reject network access if the mobile device is not located approximately within the plant boundary 19. The system of any of examples 17-18 wherein the security center:
determines if the mobile device is authorized to access or manipulate data from an isolated remote monitoring and control system;
determines if the user of the authorized mobile device is authorized to access or manipulate data from a remote monitoring and control system; and
makes modifications to data of an isolated remote monitoring and control system.

20. The system of any of examples 17-19 wherein the security center:
receives an application request to access information;
validates additional credentials; and
establishes a connection to access the requested information based on the validation of the additional credentials.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving at a computer server, a request from a mobile device to attach to a private cell phone wireless network utilizing an encrypted subscriber identifier, an encrypted equipment identifier, and an encryption key;
determining via the computer server if the subscriber identifier is in a security database;
determining via the computer server if the equipment identifier is in the security database;
estimating whether a mobile device is located approximately within a remote monitoring and control system boundary utilizing timing offsets between the mobile device and a cell tower of the cell phone wireless network;
authenticating via the computer server the mobile device using the subscriber identifier and the equipment identifier, wherein authenticating includes sharing the encryption key between the mobile device and the server to validate both the server and the mobile device as authorized;
granting access to the private cell phone wireless network only if the subscriber identifier is found in the security database, the equipment identifier is found in the security database, the mobile device is located approximately within the remote monitoring and control system boundary, and the mobile device is authenticated, otherwise access to the private cell phone wireless network is rejected; and
securely passing data between an isolated computer system and a mobile device via the private cell phone wireless network to monitor and control a remote monitoring and plant control system, wherein the passed data is control system data representative of the plant.

2. The method of claim 1 wherein validating both the server and the mobile device includes comparing received encrypted values to expected encrypted values based on the shared encryption key.

3. The method of claim 1 and further comprising registering the mobile device with a private branch exchange as on-network if access is granted.

4. The method of claim 1 and further comprising:
determining if the use of the mobile device is authorized to access or manipulate data from the remote monitoring and control system;
determining if the user of the authorized mobile device is authorized to access or manipulate data from a remote monitoring and control system; and
making modifications to data of a remote monitoring and control system.

5. The method of claim 1 and further comprising:
receiving an application request to access information;
validating additional credentials; and
establishing a connection to access the requested information based on the validation of the additional credentials.

6. The method of claim 5 and further comprising:
rejecting requests where invalid additional credentials are provided;
tracking the number of sequential rejected requests; and
determining whether to lock the phone out of the network as a function of an excess number of sequential rejected requests.

7. The method of claim 1 and further comprising:
receiving the subscriber identifier and the equipment identifier via near field communications capabilities of the mobile device at a security access control point via near field communications, wherein the subscriber identifier comprises an international mobile subscriber identity and the equipment identifier comprises an international mobile equipment identifier; and
granting access based on a comparison to information stored in the security database.

8. The method of claim 7 and further comprising:
determining if additional credentials are required prior to granting access;
receiving the additional credentials from a user of the mobile device; and
granting access if the additional information matches information in the security database.

9. The method of claim 8 wherein the additional information comprises a pass code.

10. The method of claim 7 wherein the subscriber identifier and the equipment identifier are received as encrypted values and wherein the encryption key is shared between the mobile device and the server to validate both the server and the mobile device as authorized.

11. A non-transitory computer readable storage device having instructions for causing a computer to perform a method, the method comprising:
receiving a request from a mobile device to attach to a private cell phone wireless network utilizing an encrypted subscriber identifier, an encrypted equipment identifier, and an encryption key;
determining if the subscriber identifier is in a security database;
determining if the equipment identifier is in the security database;
estimating whether a mobile device is located approximately within a remote monitoring and control system boundary utilizing timing offsets between the mobile device and a cell tower of the cell phone wireless network;
authenticating the mobile device using the subscriber identifier and the equipment identifier, wherein authenticating includes sharing the encryption key between the mobile device and the server to validate both the server and the mobile device as authorized;
granting access to the private cell phone wireless network only if the subscriber identifier is found in the security database, the equipment identifier is found in the security database, the mobile device is located approximately within the remote monitoring and control system boundary, and the mobile device is authenticated, otherwise access to the private cell phone wireless network is rejected; and
passing data between a computer system and a mobile device to monitor and control an isolated remote plant monitoring and control system, wherein the passed data is control system data representative of the plant.

12. The non-transitory computer readable storage device of claim 11 wherein validating both the server and the mobile device includes comparing received encrypted values to expected encrypted values based on the shared encryption key.

13. The non-transitory computer readable storage device of claim 11 wherein the method further comprises registering the mobile device with a private branch exchange as on-network if access is granted.

14. The non-transitory computer readable storage device of claim 11 wherein the method further comprises:
determining if the mobile device is authorized to access or manipulate data from the isolated remote monitoring and control system;
determining if the user of the authorized mobile device is authorized to access or manipulate data from an isolated remote monitoring and control system; and
making modifications to data of an isolated remote monitoring and control system.

15. T non-transitory computer readable storage device of claim 11 wherein the method further comprises:
receiving an application request to access information;
validating additional credentials;
establishing a connection to access the requested information based on the validation of the additional credentials;
rejecting requests where invalid additional credentials are provided;
tracking the number of sequential rejected requests; and
determining whether to lock the phone out of the network as a function of an excess number of sequential rejected requests.

16. The non-transitory computer readable storage device of claim 11 wherein the method further comprises:
receiving the subscriber identifier and the equipment identifier at a security access control point via near field communications;
granting access based on a comparison to information stored in the security database;
determining if additional information is required prior to granting access;
receiving the additional information from a user of the mobile device; and
granting access if the additional information matches information in the security database.

17. A system comprising:
a security center having a security database configured to:
receive an encrypted subscriber identifier, an encrypted equipment identifier, and an encryption key provided by a mobile device;
determine if the subscriber identifier is in the security database;
determine if the equipment identifier is in the security database;
estimate whether the mobile device is located approximately within a remote monitoring and control system boundary utilizing timing offsets between the mobile device and a cell tower of the cell phone wireless network, and authenticate the mobile device, wherein authenticating the mobile device further includes sharing the encryption key between the mobile device and the server to validate both the server and the mobile device as authorized;

grant access to a private cell phone wireless network only if the subscriber identifier is found in the security database, the equipment identifier is found in the security database, the mobile device is located approximately within the remote monitoring and control system boundary, and the mobile device is authenticated, otherwise access to the private cell phone wireless network is rejected; and an isolated process monitor and automation controller to interact with the security center and receive communications from the authenticated mobile device; and a media server to provide a private cell phone wireless network to communicate with authenticated mobile devices, the security center, and the process monitor and automation controller, wherein data is passed between the isolated process monitor and automation controller and a mobile device via the private cell phone wireless network to remotely monitor and control the process monitor and automation controller, wherein the passed data is control system data representative of the process.

18. The system of claim 17 wherein the security center is programmed to:
validate both the server and the mobile device by comparing received encrypted values to expected encrypted values based on the shared encryption key.

19. The system of claim 17 wherein the security center:
determines if the mobile device is authorized to access or manipulate data from the isolated process monitor and automation controller;
determines if the user of the authorized mobile device is authorized to access or manipulate data from the isolated process monitor and automation controller; and
makes modifications to data of the isolated monitor and automation controller.

20. The system of claim 17 wherein the security center:
receives an application request to access information;
validates additional credentials; and
establishes a connection to access the requested information based on the validation of the additional credentials.

* * * * *